INVENTORS
Stuart D. Pool
Rexford D. Downing
William H. Walker

United States Patent Office 2,827,750
Patented Mar. 25, 1958

2,827,750

DOUBLE KNIFE CUTTER BAR FOR HARVESTER THRESHER PLATFORMS

Stuart D. Pool, Moline, Rexford D. Downing, Rock Island, and William H. Walker, East Moline, Ill., assignors to International Harvester Company, a corporation of New Jersey Application May 15, 1956, Serial No. 585,079

2 Claims. (Cl. 56—158)

This invention relates to a new and improved double knife cutter bar for harvester thresher platforms.

Harvester threshers are employed for the purpose of harvesting and threshing the grain so harvested. Therefore, the harvesting portion of the machine is an important factor in the total efficiency of the machine. If the harvester portion functions to cut the standing grain and promptly deliver it to the threshing portion of the machine, the two portions thereof may work together harmoniously for an overall effective machine. However, in the event of failure of either part then the whole machine suffers.

It is, therefore, a principal object of this invention to provide for an efficiently operating harvester portion of a harvester thresher.

An important object of this invention is the provision of means in a harvester for facilitating the cutting of standing grain and insuring delivery of the cut grain by auger conveyer means without tangling any long grain stems around the auger conveyer core.

An important object of this invention is to supply a harvester platform with a double sickle bar wherein standing grain will be cut upon the forward motion of the machine through such grain and the second sickle bar will effectively cut long stemmed grain which might tend to wrap around a laterally moving conveyer on the platform.

Another important object of this invention is to equip a harvester platform having a transversely feeding auger conveyer thereover with a forwardly extending sickle bar and a generally rearwardly and upwardly extending sickle bar terminating closely adjacent the auger conveyor on the platform.

Another important object of this invention is to include in a harvester platform, having an auger conveyor with a retractable finger portion, a rearwardly and upwardly inclined cutter bar along the forward edge thereof so that the cutter bar terminates closely adjacent the auger conveyor and there is a differential in length between the cutter bar adjacent the retractable finger portion and the remainder of the auger conveyor.

Still another important object of this invention is to provide a forwardly and rearwardly extending sickle on the forward edge of a harvester platform and wherein the drive for the forwardly and rearwardly extending sickles are one and the same.

Another and still further important object and advantage of this invention resides in a mechanism for supporting a forwardly extending sickle bar and a generally rearwardly extending sickle bar at the forward edge of a harvester platform.

A still further important object of this invention is to equip a harvester platform with forwardly and rearwardly projecting cutter bars wherein the forwardly projecting cutter bar is horizontally disposed and the rearwardly projecting cutter bar is inclined upwardly and rearwardly.

Other and further important objects and advantages will become apparent from the disclosures in the following specification and accompanying drawings.

Figure 1:
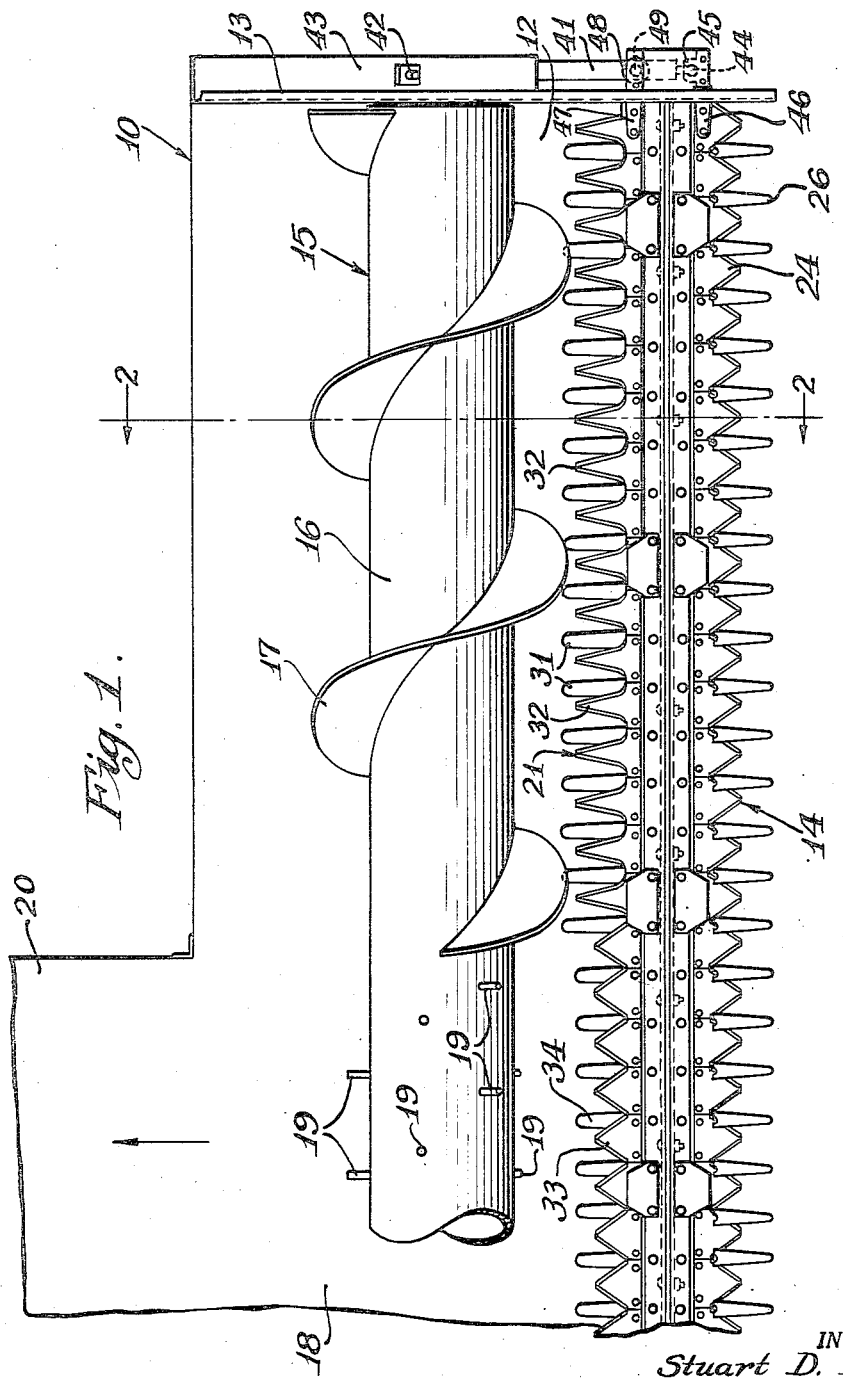
Figure 1 is a top plan view of a portion of a harvester platform showing the double sickle bar of this invention thereon.

As shown in the drawings, the reference numeral 10 indicates generally a harvester platform having a back wall 11, a generally horizontally disposed deck 12 and end walls 13. A sickle or cutter bar 14 extends forwardly from the leading edge of the deck 12 of the platform across the full width thereof to enable the harvester to cut standing grain upon the forward motion of the machine through a field of grain. The grain so cut by the sickle 14 is adapted to drop over onto the platform deck 12.

An auger conveyor 15 is mounted in the end walls 13 of the platform and is positioned across the deck portion 12 thereof. The auger conveyor includes a generally large diameter core 16 and spiral flight 17 thereon. This spiral screw flight 17 conveys the grain which has been deposited thereover toward a center area 18 of the platform. The central portion of the auger conveyor 15 adjacent the center area 18 of the platform is equipped with retractable fingers 19 at spaced intervals thereon to provide for the transfer of grain being moved laterally of the platform to a direction rearwardly of the platform for the purpose of delivering the cut and aggregated grain to a feeder housing or the like 20.

A second sickle or cutter bar 21 is immediately behind and extends rearwardly from the forwardly extending regular sickle or cutter bar 14 and it is this second cutter bar which constitutes the invention herein. The upwardly and rearwardly extending sickle bar 21 terminates closely adjacent the spiral flight 17 of the platform auger 15. The function of this second cutter bar is to cut up the long stems or stalks of grain which might otherwise tend to wrap around the auger core 16.

The forwardly projecting sickle 14 is of the usual construction wherein a housing 22 carries a ledger plate 23 and a reciprocating knife 24 composed of a plurality of sections. A knife clip 25 urges the knife 24 into shearing engagement with the ledger plate 23. The housing 22 is formed into a plurality of laterally spaced apart guard fingers 26. The action of the knife on the ledger plate is similar to the shearing of a pair of scissors. The cutter mechanism 14 includes a transversely disposed bar 27 in the form of an angle member 28 which is carried on the member 29 attached to the forward edge of the platform deck 12. The rearwardly projecting sickle bar 21 is similarly provided with a housing member 30 which terminates at its rearward end in laterally spaced guard fingers 31 which are specially elongated. Here again the knife is composed of a plurality of joined sections 32 which are considerably elongated when compared to the forwardly extending knife sections 24. That portion of the rear sickle bar 21 adjacent to the retractable finger section of the auger has standard size knife sections 33 with special short knife guards 34 to provide for clearance between the retractable fingers 19 and the knife guards 34. The bar 35 supports housing 30 by means of bolt members 36. This bar 35 is part of an angle member 37 which is fastened to the supporting member 29 which in turn is carried on the forward end of the platform deck 12. Bolt members 38 pass through the downwardly extending flanges 39 of the angle member 37 through the member 29 and through the downwardly extending flange 40 of the angle member 28.

The end 13 of the platform 10 has a pitman 41 mounted thereon for hinged or pivotal movement about a shaft 42 which is carried in supporting frame members 43, and terminates in a ball member 44 which is fastened to the end of the knife 24 in a socket 45 on the end thereof to thereby effect reciprocation of the knife when the pitman 41 is oscillated about the shaft 42. A bracket 46 is fastened to the end of the knife 24 and constitutes the support for the socket 45. Similarly a bracket 47 is fastened to the end of the knife 33 of the rearwardly extending sickle bar 21. The outer end of the bracket 47 has a socket 48 on the outer end thereof to receive a ball 49 movable with the pitman 41. Both of the sickle knives 24 and 32—33 are oscillated by the pitman 41 and thereby reciprocate simultaneously within their respective guards and on their ledger plates.

Figure 2:
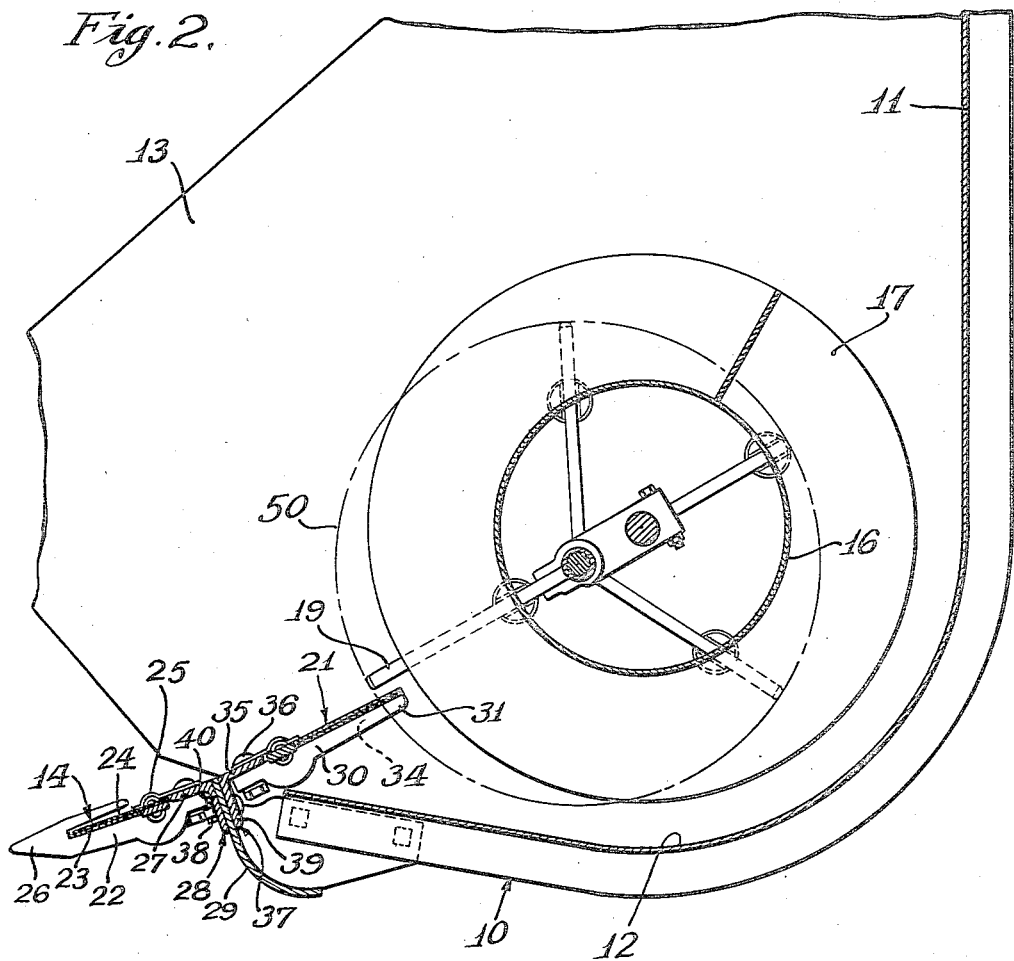
Figure 2 is a sectional view taken on the line 2—2 of Figure 1.

In the operation of the device of this invention the harvester or harvester thresher is propelled through a field of standing grain whereupon the grain is cut near its butt ends by the cutter bar 14 causing the grain and the stalks thereof to fall rearwardly onto the top of the platform auger conveyor 15. The screw flight 17 of the auger carries the grain and its stalks centrally of the platform whereby it is picked up by the retractable fingers 19 and caused to be moved rearwardly to the feeder housing 20. In the event the grain stems or stalks are long there is a normal tendency for them to wind onto the auger core 16 making it extremely difficult for them to be discharged when they arrive at the central portion of the platform 10. In order to avoid the tangling and winding of stalks onto the auger core, the rearwardly extending sickle 21 is disposed closely adjacent the forward edge of the auger conveyor flight as shown in Figures 1 and 2 whereby any stalks tending to wrap downwardly around the core of the auger will be severed and cut into short lengths thereby facilitating the feeding of the grain and its stalks to the center of the platform. The geographical relationship of the rearwardly projecting auxiliary cutter 21 with respect to the conveyor, in this case the auger, is extremely important to the successful operation of this machine. The terminal endings of the cutter bar elongated guard fingers are closely adjacent the forward edge of the auger conveyor and spaced upwardly of the platform deck as shown in Figure 2. The path of retractable finger travel is shown at 50 in Figure 2. The reason for the foreshortening of the finger guards 34 is to provide clearance between the guards 34 and the fingers 19. However, the close proximity of the rearwardly extending cutter bar 21 to the retractable fingers is substantially the same as it is over the remainder of the platform where the elongated knife sections 32 and cooperative elongated guards 31 come in close proximity to the auger screw flight 17. The successful operation of the rear knife depends upon the auger flight pulling the long stems down through the space between the rear guards 31 so that the knife 32 will cut the stems into short lengths and prevent wrapping of the grain stems about the auger core.

Figure 3:
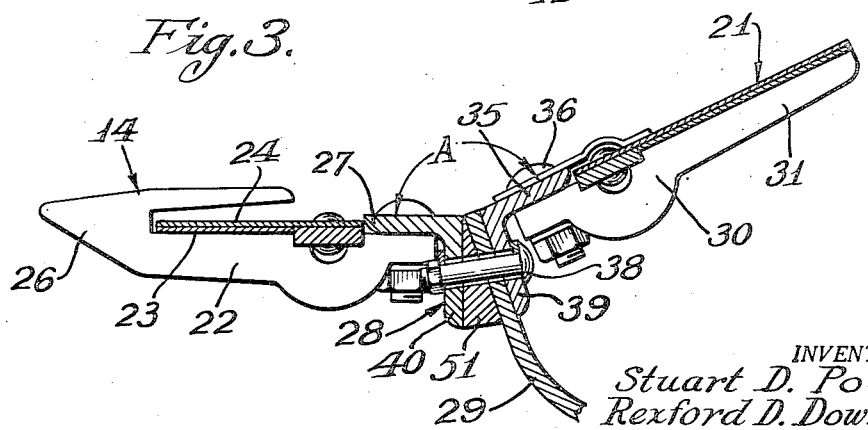
Figure 3 is a sectional view of a modified form of sickle bar of this invention.

Figure 3 shows a modified positioning of the forwardly extending sickle bar 14. The normal position of the sickle bar 14 as shown in Figures 1 and 2 is a position generally inclined downwardly and forwardly whereas in the modification as shown in Figure 3 the cutter bar is disposed substantially horizontally level. The leveling of the cutter bar 14 is accomplished by means of a wedge member 51 which is disposed between the frame supporting member 29 and the downwardly depending leg 40 of the angle member 28. It will thus be apparent that the angular disposition between the forwardly extending cutter bar 14 and the rearwardly extending cutter bar 21 is something less than the substantially straight angle relationship of the cutter bars such as shown in Figures 1 and 2. Thus the angle A shown in Figure 3 is less than 180°. Various angular changes may be accomplished by employing various sizes of wedges 51 or none at all as shown in Figure 2. The modified device of Figure 3 is employed by combine operators when combining down grain. It is their belief that when the knife and guards are at a flatter angle or nearly parallel to the ground there will be a better opportunity to pick up grain that has been blown down by storms or the like. In all other respects the operation of the modified device is the same as that shown in Figures 1 and 2.

The rearwardly extending cutter bar 21 operates to cut long grain stems to prevent its winding around the platform auger core 16. It will be apparent from the disclosure in Figure 1 that the rearwardly extending guard fingers of the cutter bar 21 terminate closely adjacent the screw flight 17 of the platform auger, and thus are in the most efficient position for the cutting of relatively long stems of grain.

We are aware that numerous details of construction may be varied throughout a wide range without departing from the principles disclosed herein and we, therefore, do not propose limiting the patent granted hereon otherwise than as necessitated by the appended claims.

What is claimed is:

1. A harvester comprising a crop receiving platform, crop conveying means on said platform for moving material laterally therealong, a first and second part cutting device located along the forward edge of said platform, said first cutting device part projecting forwardly and downwardly from the forward edge of the crop receiving platform, for the purpose of cutting the crop through which the harvester runs, said first cutting device part including a stationary guard and a reciprocable knife therein, said second cutting device part located rearwardly of said first part and projecting upwardly and rearwardly therefrom, said second part having a stationary guard terminating closely adjacent said crop conveying means, and a reciprocable knife in said stationary guard whereby crop cut by the first cutting device part falls over onto the crop receiving platform and onto the crop conveying means thereon and whereby any crop projecting from said crop conveying means is cut by said second cutting device by reason of its proximity to said crop conveying means, and means for effecting reciprocation of said first and second part cutting device knives.

2. A device as set forth in claim 1 in which said second cutting device part lies at an angle with respect to said first cutting device part which is something less than a straight angle.

References Cited in the file of this patent

UNITED STATES PATENTS

| | | |
|---|---|---|
| 681,316 | Hindbjorgen | Aug. 27, 1901 |
| 1,806,928 | Bartels | May 26, 1931 |
| 2,082,764 | Hosier | June 1, 1937 |
| 2,517,390 | Downing | Aug. 1, 1950 |
| 2,529,180 | Oehler | Nov. 7, 1950 |
| 2,644,284 | Oberholtz et al. | July 7, 1953 |